United States Patent
Hennessy

(10) Patent No.: US 12,220,647 B2
(45) Date of Patent: *Feb. 11, 2025

(54) SYSTEMS AND METHODS FOR USING SEEDS TO STORE OUTCOMES AND RECREATING OUTCOMES USING SEEDS WITH A RANDOM NUMBER GENERATOR

(71) Applicant: Aristocrat Technologies, Inc., Las Vegas, NV (US)

(72) Inventor: Edward Hennessy, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,679

(22) Filed: Aug. 17, 2023

(65) Prior Publication Data

US 2023/0390631 A1 Dec. 7, 2023

Related U.S. Application Data

(63) Continuation of application No. 17/817,625, filed on Aug. 4, 2022, now Pat. No. 11,766,604, which is a continuation of application No. 17/006,323, filed on Aug. 28, 2020, now Pat. No. 11,420,108.

(51) Int. Cl.
*A63F 3/06* (2006.01)
*G06F 7/58* (2006.01)
*G07F 17/32* (2006.01)

(52) U.S. Cl.
CPC ............ *A63F 3/0645* (2013.01); *G06F 7/588* (2013.01); *G07F 17/3213* (2013.01); *G07F 17/3253* (2013.01); *G07F 17/329* (2013.01)

(58) Field of Classification Search
CPC .... A63F 3/0645; G06F 7/588; G07F 17/3213; G07F 17/3253; G07F 17/329
See application file for complete search history.

(56) References Cited

U.S. PATENT DOCUMENTS

| | | |
|---|---|---|
| 6,533,664 B1 | 3/2003 | Crumby |
| 6,866,584 B2 | 3/2005 | Michaelson |
| 6,988,946 B2 | 1/2006 | Michaelson |
| 7,329,183 B2 | 2/2008 | Michaelson |
| 7,399,227 B2 | 7/2008 | Michaelson |
| 7,473,176 B2 | 1/2009 | Michaelson |
| 7,479,062 B2 | 1/2009 | Michaelson |

(Continued)

OTHER PUBLICATIONS

Office Action dated Jan. 12, 2022 for U.S. Appl. No. 17/006,323 (pp. 1-11).

(Continued)

*Primary Examiner* — Werner G Garner
(74) *Attorney, Agent, or Firm* — Armstrong Teasdale LLP

(57) ABSTRACT

An electronic gaming machine and a method are provided which generates outcome presentations from a Class 2 or a central determination game outcome. A database stores RNG seeds that correspond to various presentations. To generate the outcome presentations, the RNG seeds are retrieved from the database and random numbers are generated from the RNG seeds. These random numbers are then used to generate the outcome presentations for the Class 2 or central determination game outcome. The RNG seeds may be stored as a series of RNG seeds which may be individually accessed to eliminate certain outcomes or sort certain outcomes prior to presentation.

20 Claims, 11 Drawing Sheets

(56) References Cited

U.S. PATENT DOCUMENTS

| | | |
|---|---|---|
| 7,628,703 B2 | 12/2009 | Wolf |
| 7,658,672 B1 | 2/2010 | Wolf |
| 7,833,093 B2 | 11/2010 | Michaelson |
| 7,857,693 B1 | 12/2010 | Johnson |
| 8,251,824 B2 | 8/2012 | Michaelson |
| 8,475,257 B2 | 7/2013 | Bienvenue |
| 8,500,538 B2 | 8/2013 | Warner |
| 8,932,129 B2 | 1/2015 | Powell |
| 9,922,489 B2 | 3/2018 | Michaelson |
| 10,008,071 B2 | 6/2018 | Powell |
| 11,183,026 B2 | 11/2021 | Selegue |
| 2006/0046827 A1 | 3/2006 | Saffari |
| 2006/0205468 A1 | 9/2006 | Saffari |
| 2011/0223991 A1 | 9/2011 | Powell |
| 2012/0058810 A1 | 3/2012 | Michaelson |
| 2012/0270638 A1 | 10/2012 | Eubanks |
| 2017/0092071 A1 | 3/2017 | Cuddy |
| 2019/0043316 A1 | 2/2019 | Selegue |
| 2020/0074805 A1 | 3/2020 | Selegue |

OTHER PUBLICATIONS

Office Action (Notice of Allowance and Fees Due (PTOL-85)) dated Apr. 25, 2022 for U.S. Appl. No. 17/006,323 (pp. 1-10).
Office Action (Notice of Allowance and Fees Due (PTOL-85)) dated Jul. 14, 2022 for U.S. Appl. No. 17/006,323 (pp. 1-10).
Office Action dated Apr. 13, 2023 for U.S. Appl. No. 17/817,625 (pp. 1-9).
Office Action (Notice of Allowance and Fees Due (PTOL-85)) dated May 22, 2023 for U.S. Appl. No. 17/817,625 (pp. 1-10).

SYSTEMS AND METHODS FOR USING SEEDS TO STORE OUTCOMES AND RECREATING OUTCOMES USING SEEDS WITH A RANDOM NUMBER GENERATOR

CROSS REFERENCE TO RELATED APPLICATIONS

This application is a continuation of and claims priority to U.S. patent application Ser. No. 17/817,625, filed Aug. 4, 2022, which is a continuation of U.S. patent application Ser. No. 17/006,323, now U.S. Pat. No. 11,420,108, filed Aug. 28, 2020, which are incorporated herein by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming machine is provided. The electronic gaming machine includes a display device, a processor, and a memory device storing instructions, which when executed by the processor, cause the processor to, at least: determine a bingo game outcome, the bingo game outcome, based at least in part on a bingo ball call and a bingo card, the bingo game outcome including an bingo outcome amount, retrieve, from a database stored in the memory device, at least one award profile that corresponds to the bingo outcome amount from a plurality of award profiles, select at least one presentation record stored in the database that corresponds to the at least one award profile, select at least one segment that corresponds to the at least one presentation record from the database, for each of the at least one segment that corresponds to the presentation record, retrieve a corresponding RNG seed value from the database, and for each of the corresponding RNG seed value, determine a reel-based game outcome and display the determined reel-based game outcome on the display device.

In another aspect, a method of operating an electronic gaming machine for displaying outcomes is provided. The method includes: determining, by a game controller, a bingo game outcome, the bingo game outcome, based at least in part on a bingo ball call and a bingo card, the bingo game outcome including an bingo outcome amount; retrieving, from a database stored in a memory device coupled to the game controller, at least one award profile that corresponds to the bingo outcome amount from a plurality of award profiles; selecting, by the game controller, at least one presentation record stored in the database that corresponds to the at least one award profile; selecting, by the game controller, at least one segment that corresponds to the at least one presentation record from the database; for each of the at least one segment that corresponds to the presentation record, retrieving, by the game controller, a corresponding RNG seed value from the database; and for each of the corresponding RNG seed value, determining, by the game controller, a reel-based game outcome and displaying, the determined reel-based game outcome on a display device coupled to the game controller.

In yet another aspect a non-transitory computer-readable storage medium storing computer-executable instructions is provided. The instructions when executed by a computing device, cause the computing device to, at least: determine a bingo game outcome, the bingo game outcome, based at least in part on a bingo ball call and a bingo card, the bingo game outcome including an bingo outcome amount; retrieve, from a database stored in a memory device, at least one award profile that corresponds to the bingo outcome amount from a plurality of award profiles; select at least one presentation record stored in database that corresponds to the at least one award profile; select at least one segment that corresponds to the at least one presentation record from the database; for each of the at least one segment that corresponds to the presentation record, retrieve a corresponding RNG seed value from the database; and for each of the corresponding RNG seed value, determine a reel-based game outcome and display the determined reel-based game outcome on a display device.

DETAILED DESCRIPTION

Various embodiments of the present disclosure are directed to storing RNG seed values in a presentation database instead of reel stop positions. The RNG seed values are used to determine reel stop positions by the gaming machine to present outcomes from a class 2 bingo game. A single RNG seed value may be used to generate multiple outcomes, such as the outcome of a base game in which free spins may be awarded and each spin of the free spin game. Using RNG seed values instead of the reel stop positions allows sorting of the free spin outcomes and even filtering out certain outcomes from the presentation.

In a bingo slot game each of the game outcome facades or presentations are comprised of a sequence of one or more RNG outcomes, each RNG outcome corresponding to a reel stop position. When a façade is selected by the game to present a game outcome the sequence of RNG outcomes are visually presented to the player as a reel spin sequence comprised of the corresponding one or more reel stop positions.

A bingo slot game may be comprised of a number of facades for each of a number of game outcome credit values, e.g., fifteen different ways (facades) to present a ten credit award game outcome, ten different ways to present a one thousand credit award game outcome, etc. and the larger award facades can get quite lengthy, e.g., to present the award as a set of free spin reel stops, a multi-step feature game, etc. As such the memory requirement to store all these façades as strings of RNG outcomes can become substantial.

A pseudo random number generator, when seeded with a particular RNG seed, will generate a predetermined sequence of RNG outcomes corresponding to that particular RNG seed. Accordingly, if an RNG seed is known to generate a specific sequence of RNG outcomes, e.g., corresponding to a specific bingo game façade, that seed can be used to store that façade. When that façade is selected by the game to present a game outcome, the pseudo RNG is seeded with the RNG seed corresponding to that façade and, as such, the pseudo RNG generates the desired sequence of RNG outcomes corresponding to the sequence of reel stops comprising the façade.

Figure 1:
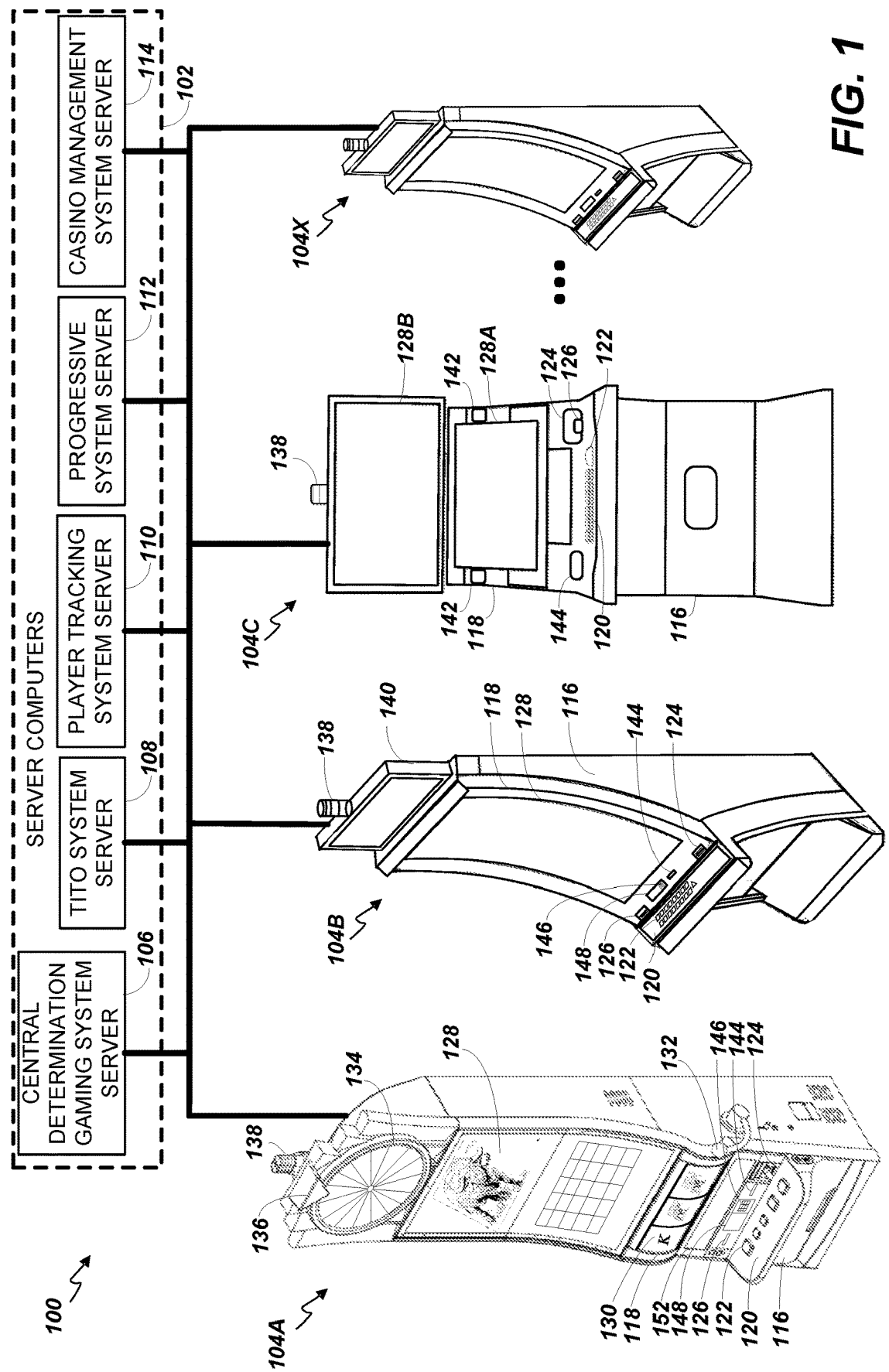
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
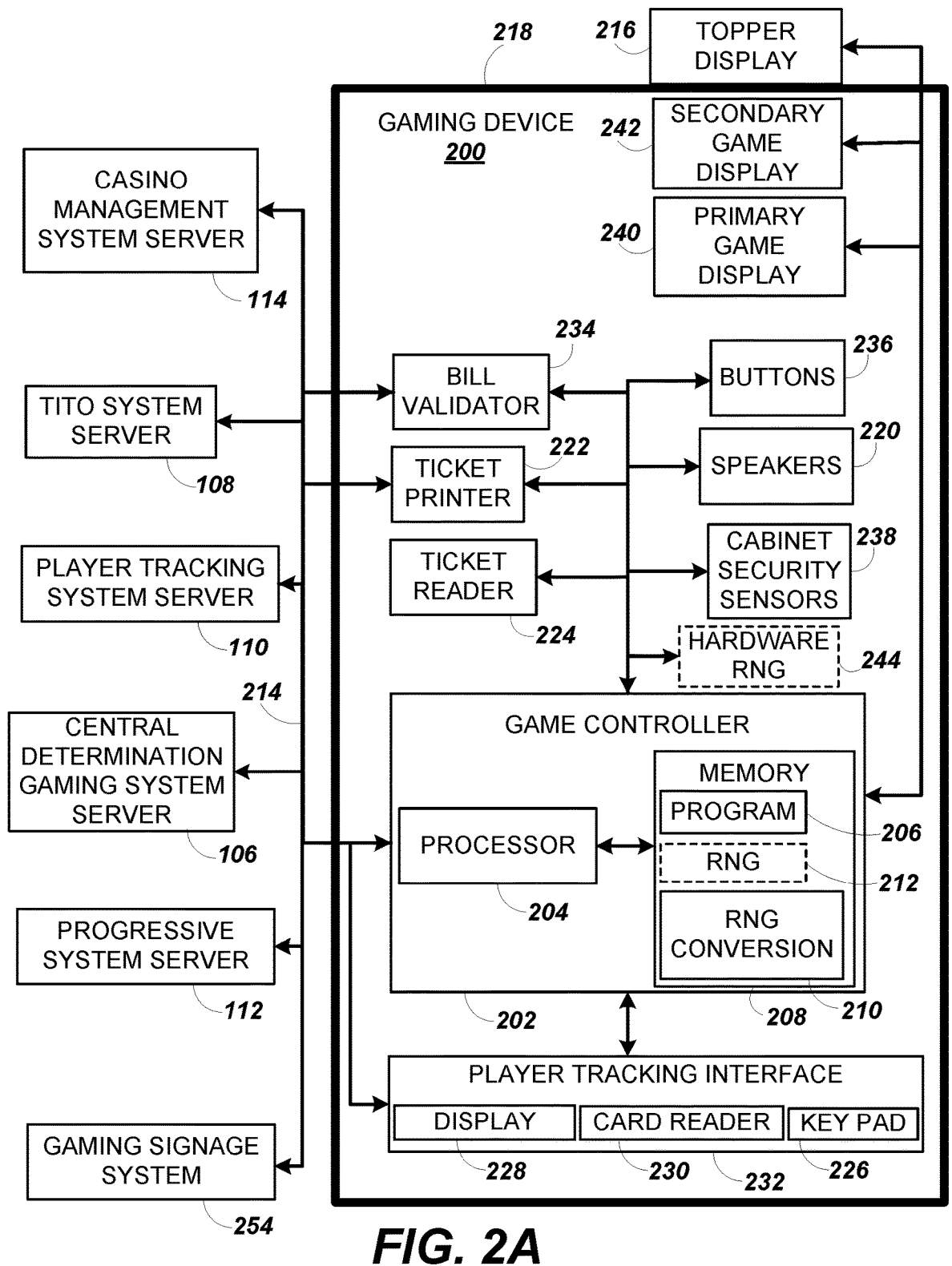
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
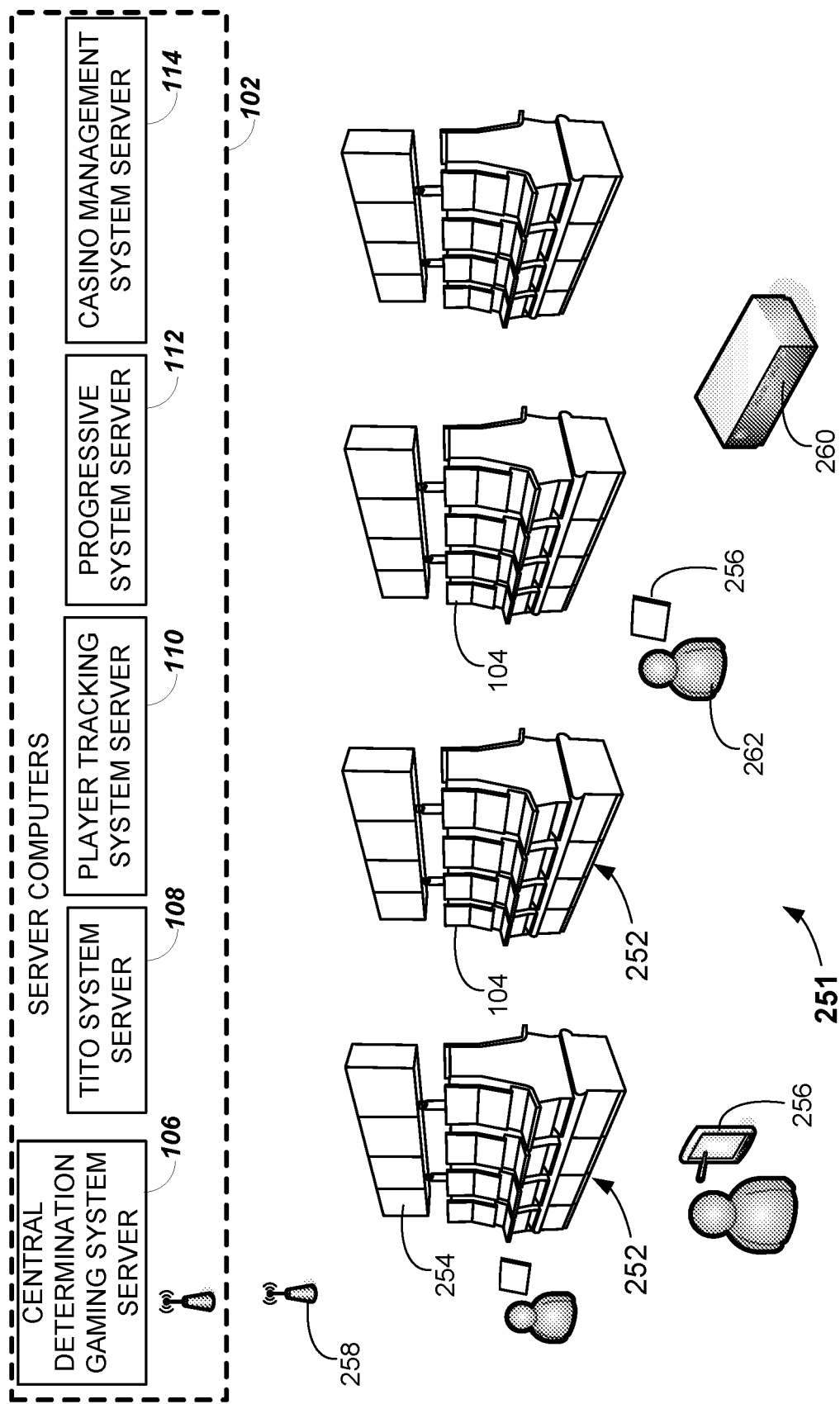
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
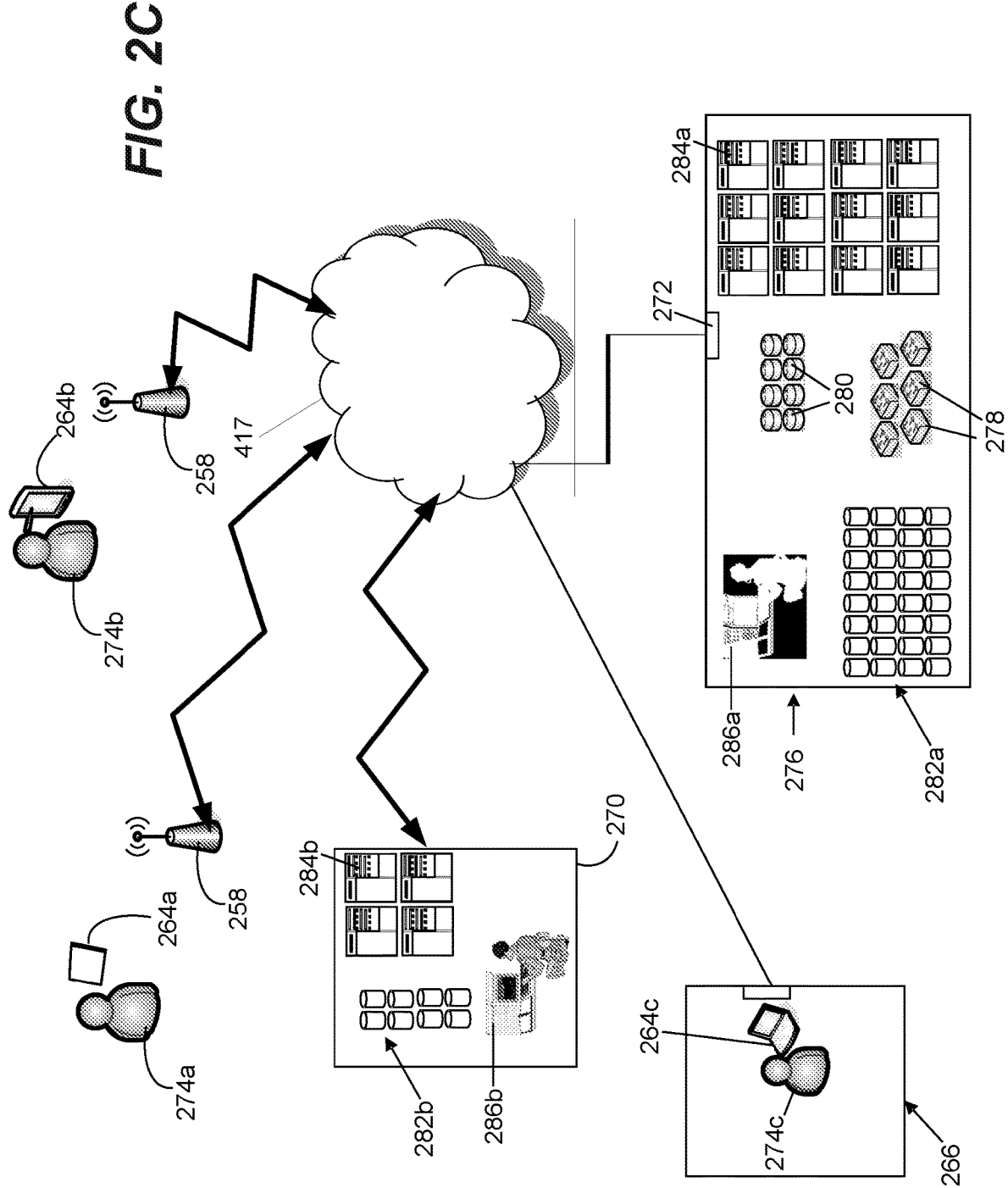
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server (s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
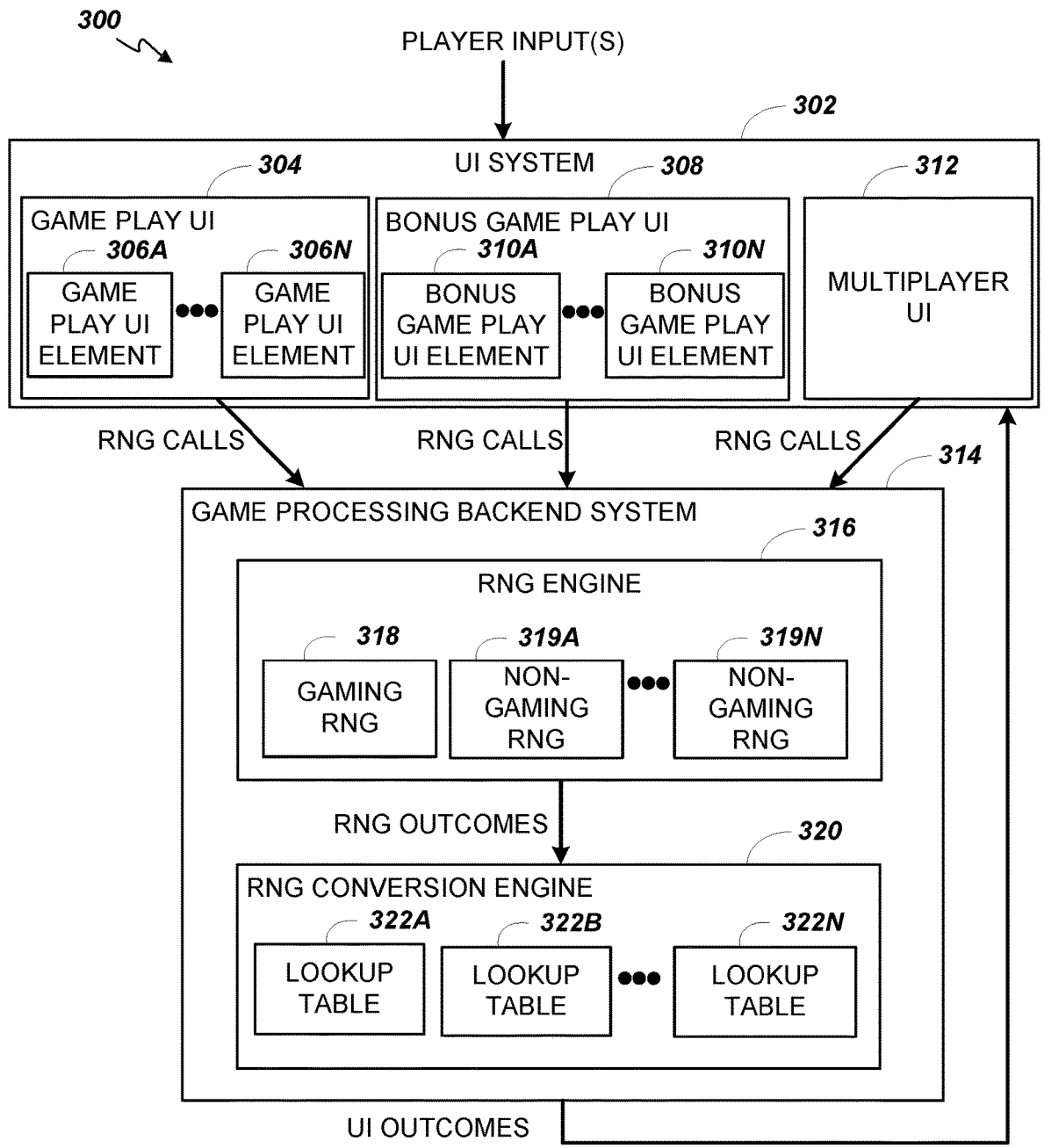
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
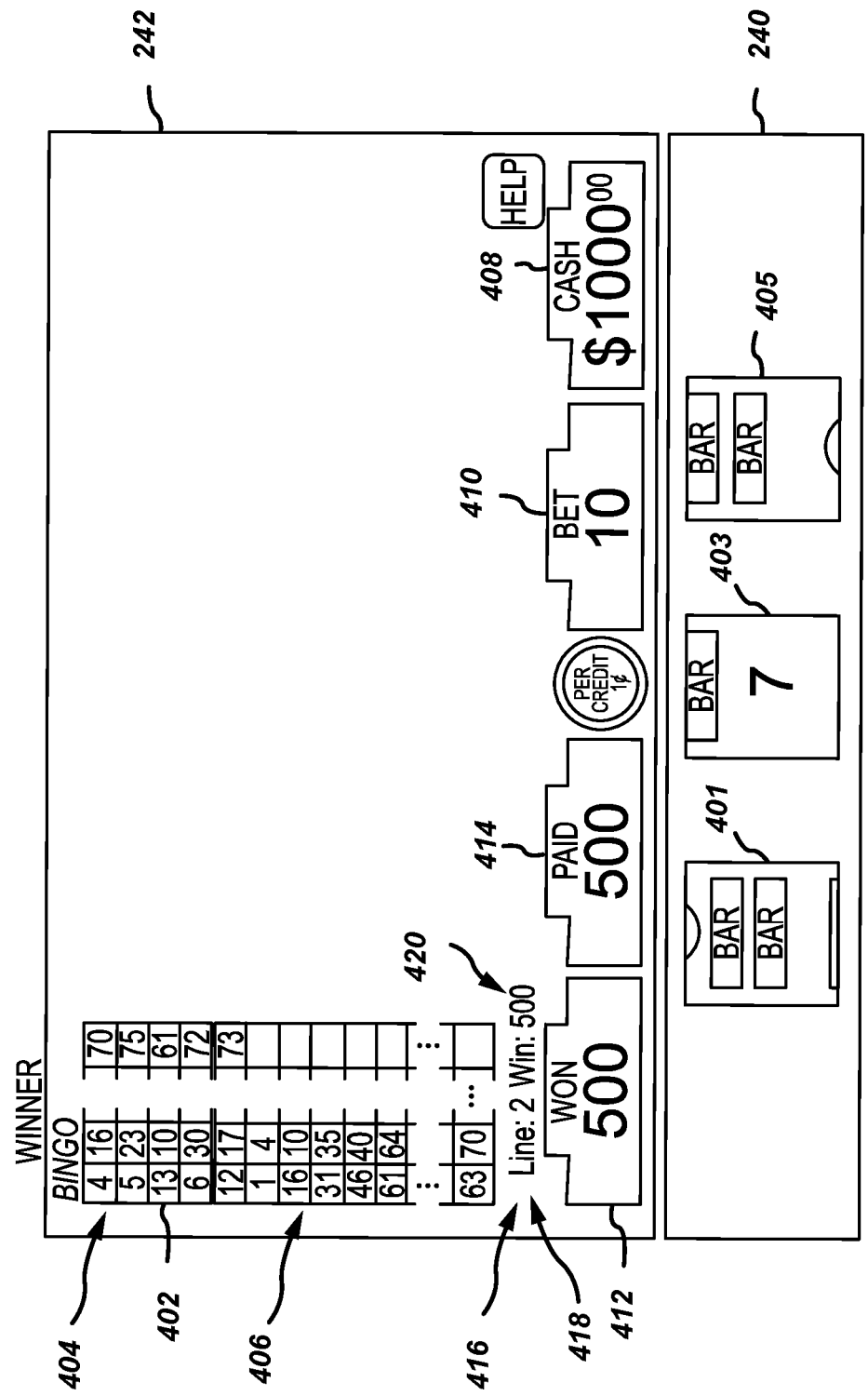
FIG. 4 depicts an example of a Class II bingo game being displayed according to various aspects of the present disclosure.

FIG. 4 depicts an example of a Class II bingo game being displayed in the primary game display 240 and secondary game display 242 of the EGM 200 of FIG. 2. In the example of FIG. 4, a plurality of reels 401, 403, and 405 are displayed within the primary game display 240. While only three reels 401, 403, 405 are shown in the example of FIG. 4, in some examples, more or fewer reels may be used. In some examples, the reels 401, 403, and/or 405 may be implemented as mechanical reels. As shown, each reel 401, 403, 405 has a plurality of symbol display positions for presenting symbols (and/or symbol combinations) which may be associated with winning and/or losing reel game outcomes and/or rewards.

In the example of FIG. 4, a bingo card 404 and a bingo number listing 406 are displayed in the secondary game display 242. As shown, the bingo card 404 comprises a matrix of bingo cells 402 (e.g., squares). In some examples, the matrix may be a 5×5 matrix of 25 total cells. In some examples, the bingo card 404 may have a matrix of a different size (e.g., 3×3, 4×4, 4×5, 4×6, 6×6, 7×7, 3×8, 10×10, etc.). In some examples, the matrix may be larger or smaller. In the example of FIG. 4, each cell 402 in the matrix of the bingo card 404 includes a number that is not repeated in any other cell of the bingo card 404.

In the example of FIG. 4, the secondary game display 242 further displays a credit meter 408 showing an amount of money and/or credits (e.g. credit balance) held by a player of the EGM 200. In the example of FIG. 4, the credit balance 408 shows $1000. The secondary display 242 additionally shows a wager meter 410 adjacent to the credit meter 408, under "BET." In the example of FIG. 4, the amount wagered is 10 credits (e.g., $0.10). The amount wagered (e.g., via the user interface) may be deducted from the credit meter 408. The secondary game display 242 additionally displays a win meter 412 and a total win meter 414. In the example of FIG. 4, the win meter 412 is 500, indicating that the simulated combination of symbols in reels 401, 403, 405 is associated with a 500 credit reward (which is equal to the reward associated with the bingo game outcome). As shown, the total win meter 414 is also 500, indicating that the cumulative total of rewards received comprises just that one 500 credit reward. In the example of FIG. 4, the secondary game display 242 further displays reel win information 416. The reel win information 416 includes win line information 418 and reward information 420. The win line information 418 indicates which win line in the reels 401, 403, 405 contains symbols comprising a winning reel game outcome. The reward information 420 indicates an associated reward amount for that winning reel game outcome.

In some examples, the bingo game may be a networked game that involves two or more networked EGMs 200. The bingo server 107 may manage (and/or host) the bingo game, such as by generating the bingo card 404 and/or bingo number listing 406. In some examples, the bingo card 404 (and/or information on which the bingo card 404 is based), and/or the bingo number listing 406 may be generated using an RNG. In some examples, the bingo card 404 may be randomly selected from a set of bingo cards or a player may select their own bingo card 404 (e.g., via the user interface), such as from a set of randomly generated bingo cards, for example.

In operation, a player and/or EGM 200 may be provided with the bingo card 404, such as by bingo server 107. For example, a player may be provided a new bingo card 404 each time a "Spin" or "Play" button is pressed by the player (e.g., via user interface), provided the player has made a wager. In some examples, more than one bingo card 404 may be generated in response to wager. The bingo number listing 406 (e.g., "ball call") may be randomly generated, such as by bingo server 107. The bingo card 404 may be compared to the current bingo number listing 406, and numbered cells 402 on the bingo card 404 that match numbers in the bingo number listing 406 may be marked or "daubed" on the bingo card 404. Finally, the marked or daubed bingo card 404 may be evaluated against a paytable of winning bingo patterns.

The bingo number listing 406 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing 406. Other game-ending patterns are also possible. When the game-ending pattern is awarded, the bingo number listing 406 is reset, and the process repeats. In some examples, a single play of the bingo game includes a wager, a bingo card, a bingo number listing 406, a matching of the numbers called with those on a bingo card 404, a determination of a bingo game outcome, and a presentation of an associated reward, if any.

A bingo game outcome may be determined by comparing one or more patterns of marked (and/or "daubed) cells of the bingo card 404 with the paytable of winning bingo patterns. If the bingo card 404 does not include a pattern that matches a pattern in the paytable of winning patterns, then a losing bingo outcome is determined, and no reward may be provided to the player. If the bingo card 404 does include a pattern that matches a pattern in the paytable of winning patterns, then a winning bingo outcome is determined, and a reward may be provided to the player.

Different winning patterns may be associated with different rewards. The reward for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g. all winning patterns) that are matched when the bingo card 404 is evaluated against the paytable of winning patterns. In some examples, the player may be rewarded for only the highest priority pattern (e.g. the highest paying winning pattern) that is matched. In some examples, during play of a Class II game, a player is provided or selects a single bingo card 404 for multiple plays of the bingo game, with a new bingo number listing 406 generated for each play of the bingo game. Other methods of play of a Class II bingo game are also possible and are within the scope of this disclosure.

The bingo game outcome may be presented to the player via a spinning reel game simulation. In the example of FIG. 4, the spinning reel game is simulated via the plurality of reels 401, 403 and 405 in the primary game display 240. For each play of the bingo game, the bingo game outcome is presented as a reel spin outcome in the reel game. In some examples, the spinning reel game simulation may operate by spinning each reel 401, 403, 405 and then stopping each reel 401, 403, 405 in a particular position to obtain a matrix of symbols. One or more combinations of symbols in the matrix of symbols may be associated with a reel game outcome that is equal to the main bingo game outcome. For example, a winning bingo game outcome may be displayed as a winning combination of reels 401, 403 and 405. Similarly, a losing bingo game outcome may be displayed as a losing combination of reels 401, 403 and 405. Different outcomes of the bingo game may be displayed as different outcomes in the spinning reel game. Thus, the bingo game outcome is presented to the player as a particular reel spin outcome of reels 401, 403 and 405.

Figure 5:
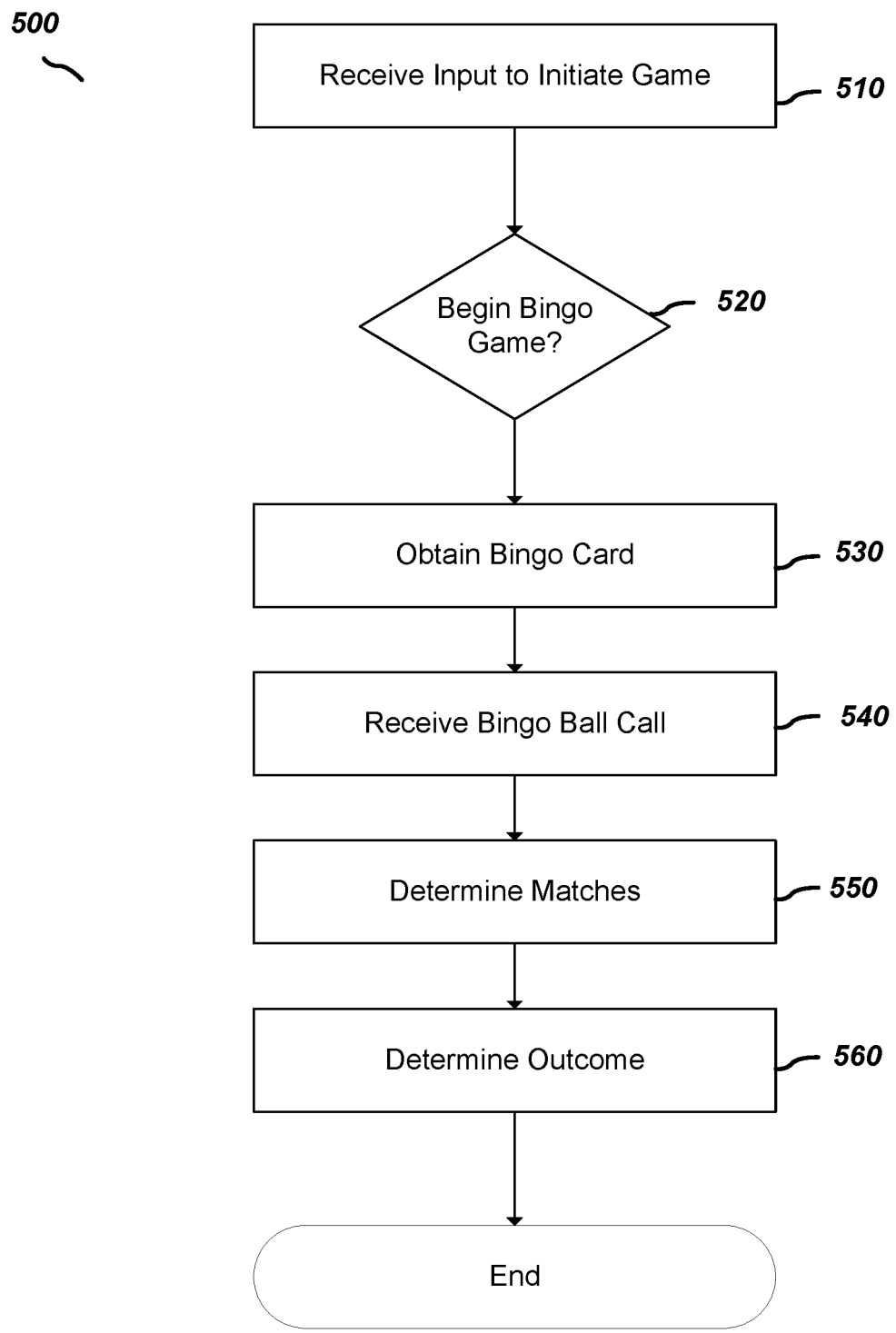
FIG. 5 depicts a flowchart for the operation of various embodiments in accordance with the present disclosure to determine a bingo game outcome.

FIG. 5 depicts a flowchart for the operation of various embodiments in accordance with the present disclosure of a process 500 to determine a bingo game outcome. Process 500 may be implemented at a bingo game terminal such as gaming device 200. Process 500 may begin at 510 when an input is received to initiate a game instance at an input device of gaming device 200, such as buttons 236. Gaming device 200 may determine whether the bingo game may begin at 520. Gaming device 200 may determine whether certain criteria are met to begin the bingo game. Such criteria may include checks such as ensuring there is a sufficient credit balance present, whether a player has inserted a player loyalty card, or logged in to gaming device using credentials established with a player tracking system server 108 and/or casino management system server 114. Such criteria may also include a determination of whether there are enough players to play a bingo game. In certain bingo jurisdictions, a requirement to operate a bingo game on a gaming device, such as gaming device 200 is that there are at least 2 player participating in the bingo game. Gaming device 200 may check whether there is one other player (operating another gaming device 200) participating in the bingo game prior to begin the bingo game instance at 520. This determination may be made by gaming device 200 in conjunction with bingo server 107. In case the gaming device 200 (or bingo server 107) determines that the bingo game may not begin, process 500 may end. In other embodiments, process 500 may be paused until any condition that was not met to begin play of the bingo game is satisfied.

Operation of process 500 then shifts to obtaining a bingo card 404 at 530. In various embodiments, gaming device 200 stores a quantity of bingo cards for use in memory 208. These bingo cards may be generated prior to their use by gaming device 200 or obtained from the bingo server 107. After a certain number of cards are used up, a new quantity may be generated or obtained. In certain embodiments, gaming device 200 obtains the bingo card 404 from the bingo server 107. In certain embodiments, more than one bingo card may be used to determine an outcome, or multiple outcomes (with one bingo card each per outcome) may be used to generate a bingo game outcome.

Bingo ball call may be obtained by gaming device 200 from bingo server 107 at 540. In certain embodiments, a first quantity of initial balls are received and after the initial quantity, additional balls are called out at predefined time intervals. This sequential listing of balls (numbered 1-80 or otherwise) is the bingo ball call. Gaming device 200 then determines any matches between the numbers on the bingo card 404 and the bingo ball call at 550. One or more patterns may be formed by marking the numbers on bingo card 404 with the numbers in the bingo ball call. Gaming device 200 may then determine an outcome based on the patterns formed at 560. Bingo game outcome may be determined by marking spots on bingo card 404 based on the bingo ball call 406. The numbers in the bingo ball call 406 that also exist on the bingo card 404 may be marked or daubed on the card as spots. Spots marked on bingo card 404 may form one or more bingo patterns. Each of those patterns may correspond to an award amount which may be stored in the bingo paytable such as the paytable of winning patterns. The bingo game award amount may be the sum of the amounts for each of the patterns marked on the bingo card 404 for the play of a game. In other embodiments, the bingo game award amount may be the sum of one or more of the amounts corresponding to the one or more of the patterns marked on the bingo card 404.

The outcome may then be displayed on gaming device 200 in one or more formats. A first format may simply show the patterns on bingo card 404. Another format may be in the form of a spinning reel game. Gaming device may spin and stop reels of the spinning reel game at certain positions such that the outcome and payout of the spinning reel game matches the outcome of the bingo game. In certain embodiments, the spinning reel game may be based on a spinning reel game that uses a random number generator to determine its outcomes (commonly known as Class 3 games). Such a class 3 spinning reel game may use paytables that correspond to certain symbols being aligned on the screen to obtain outcomes and awards.

The bingo game award amount forms a part of the outcome. The other part of the outcome may include a game presentation that shows a spinning reel game, such as a slot game that forms symbol combinations that provide an award amount that is the same as the bingo game award amount. The spinning reel game may be associated with a different paytable than the bingo paytable. The paytable associated with the spinning reel game shows award amounts for different symbols combinations. The award amount, if any, associated with the spinning reel outcome matches the bingo game award amount. The spinning reel game may also include various bonus games, such as free spin games, pick games, match games, and other types of bonus game types. If the spinning reel outcome corresponds to a bonus trigger condition, then the bonus game is displayed on the display device. The total award amount of the spinning reel game is the award amount associated with the outcome of the base game (the reels) and the bonus game, if any.

In order to have the award outcome of the spinning reel game match the bingo game award amount, the spinning reel game is controlled to display an outcome that has an award amount that is the same as the bingo game award amount. In order to achieve this, a number of spinning reel game outcomes and their corresponding award amounts are stored in a database of outcomes. This database of outcomes may be stored in the memory 208 of gaming device 200. This database stores an award amount and corresponding reel stop positions for each reel of the spinning reel game. These outcomes are determined in advance by simulating the spin of the reels and storing the reel positions and corresponding award amounts. The reel positions indicate a stop position for each reel. Once a stop position is known for each reel, the reel can be displayed to spin and come to a stop at the corresponding stop position. The symbols displayed on the display screen will form symbol combinations such that the total award amount of those symbol combinations is the award amount that corresponded to the displayed reel stop position.

While storing reel stop positions is a simple way of storing the outcome of the reel base game and recreating the outcome, due to the large number of potential outcomes and reels, this can be a large amount of data. Additionally, in order to generate this database, the reel spin game has to be simulated using the paytables and the award amount along with the reel stop positions has to be recorded. Further, for certain bingo game award amounts that are large, a single outcome of a reel spin game may not provide that exact award amount. Therefore, a bonus game having a quantity of free spins may be provided as the outcome, with the bingo award amount provided over the base game outcome and the free spin outcomes. To store this particular outcome, the reel stops of each spin of the free spin game have to be stored as well. These may typically be stored as one single outcome that contains the individual outcomes for each of the base game spin and each of the free spin rounds.

Instead of storing reel stop positions, another embodiment uses RNG seeds. Each RNG seed is a seed value that is provided to a random number generator which generates a random outcome based on the seed value and when the random outcome is passed through a game outcome engine, a certain outcome is produced. When the game is simulated, instead of storing the reel stop position, the RNG seed value that was used by the random number generator is stored along with the award amount. Therefore, to recreate the outcome, the stored RNG seed value is passed to the same random number generator and the expected outcome is obtained. The game outcome engine is similar to the game processing backend system 314 depicted in FIG. 3 that uses random numbers from Gaming RNGs 318 and passes them through the lookup tables 322 to determine the UI outcomes.

Figure 6:
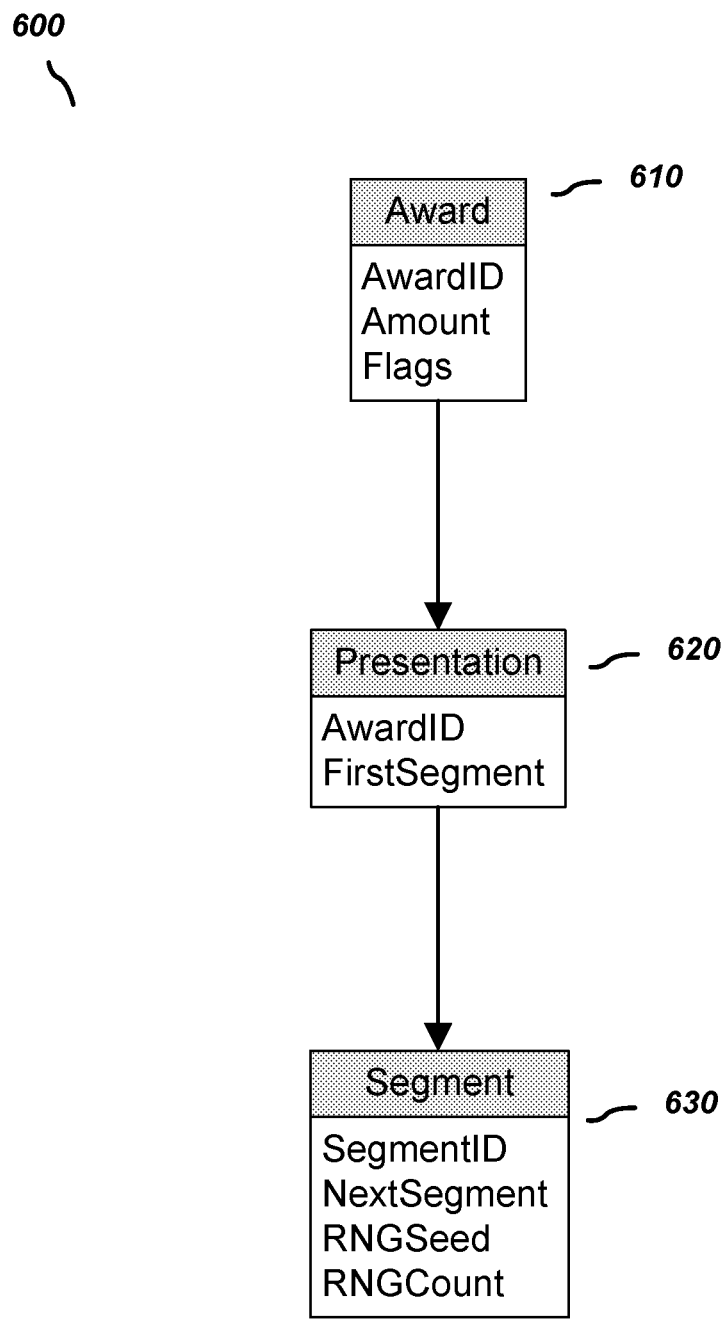
FIG. 6 depicts an example schema of a database that stores outcomes and RNG seeds in accordance with various embodiments of the present disclosure.

FIG. 6 depicts an example schema 600 of a database that stores outcomes and RNG seeds in accordance with various embodiments of the present disclosure. Schema 600 includes Award table 610, Presentation table 620, and Segment table 630. Award table 610 includes fields Award ID, Amount and Flags. Award ID is a unique identifier for each record. Amount field stores an amount associated with that record and Flags field stores whether the award is a base game award, bonus award, jackpot award, etc. Award table 610 may be linked to Presentation table 620. In certain embodiments, this may be a one to many relationship where one record in Award table 610 may be linked to many records in Presentation table 620. This signifies that for a given award amount, there may be more than one presentation records that correspond to that award amount. Presentation table 620 may include fields Award ID and First Segment. First Segment field stores a Segment ID of a linked record in Segment table 630. In certain embodiments, Presentation table 620 is linked to Segment table 630 in a one to many relationship. This may signify that for a single presentation record there may be multiple segment records linked. Further since Segment table 630 includes Next Segment field, a particular segment record may link to the next segment. In this way, a presentation having multiple segments linked to it can be recreated by selecting the first segment, retrieving the RNG Seed from the record, then retrieving the next segment, and so on.

Segment table 630 stores Segment ID, Next Segment, RNG Seed and RNG Count fields. As discussed above, Next Segment field stores a Segment ID of the next segment in the sequence of segments. RNG Seed field stores the actual RNG Seed that is used to generate the outcome. RNG Count stores a count that identifies the number of random numbers that are to be generated from the RNG Seed. In a number of cases, this may be one, which indicates that a single outcome is to be generated using that particular RNG Seed. However, in certain cases, this may be more than one. For example, if an outcome triggers the play of a free spin game, with a certain quantity, say 5, free spins, a single RNG Seed can be used to recreate the base game outcome (that triggers the free spin game) and the five free spins. In this case, the RNG Count field may store the value 6, indicating that 6 random numbers are to be generated using the RNG Seed.

Figure 7:
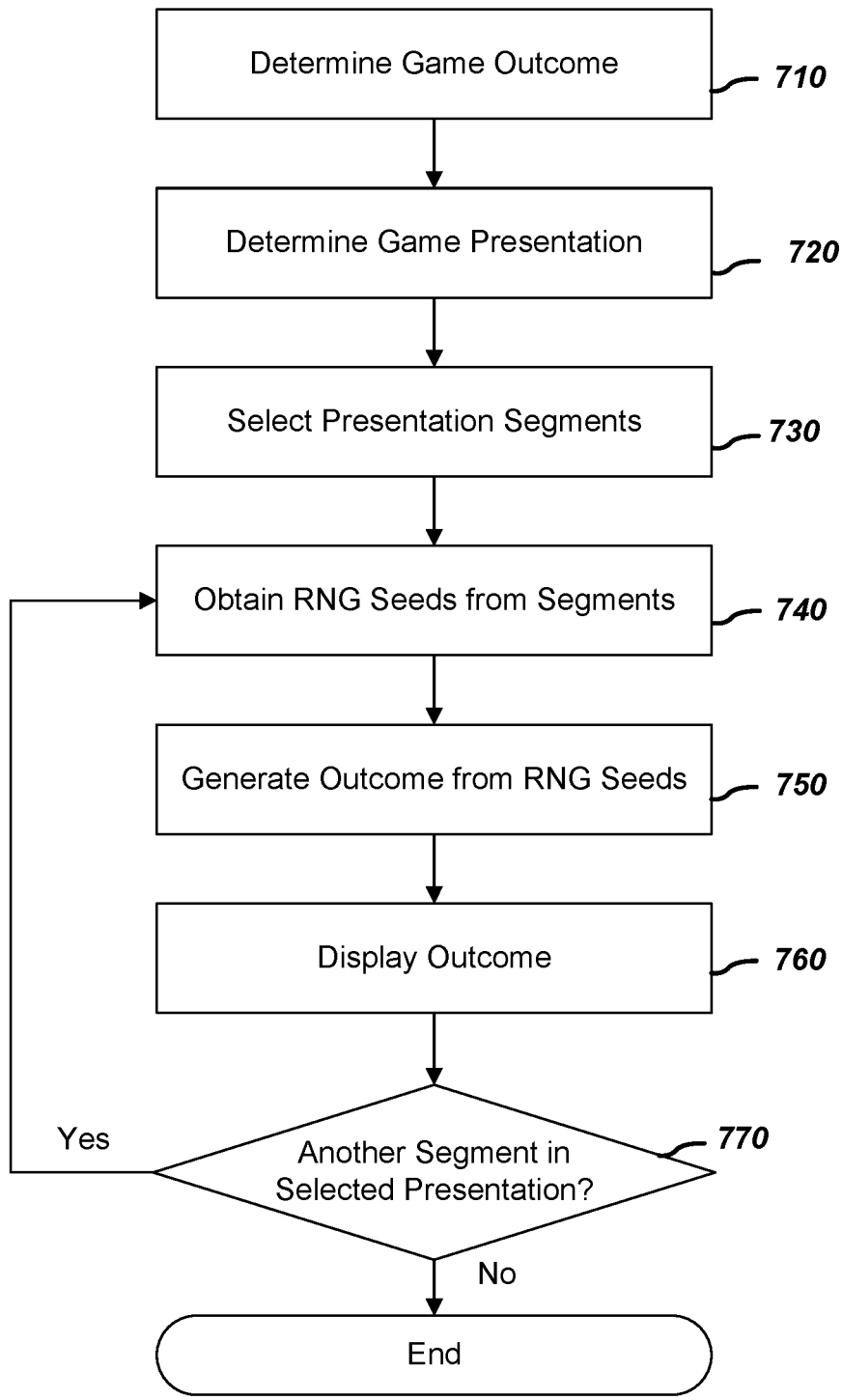
FIG. 7 depicts a flowchart for the operation of various embodiments in accordance with the present disclosure of a process to present a bingo game outcome as an outcome of a spinning reel game.

FIG. 7 depicts a flowchart for the operation of various embodiments in accordance with the present disclosure of a process 700 to present a bingo game outcome as an outcome of a spinning reel game. Although the flowchart of FIG. 7 describes converting a bingo game outcome to an outcome of a spinning reel game, the bingo game outcome may be converted to games other than spinning reel games in accordance with various embodiments described herein. Process 700 may begin at block 710 where the bingo game outcome is determined by processor 204. The bingo game outcome may be determined, for example, using process 500 depicted in FIG. 5. The bingo game outcome may include a bingo game outcome amount. At block 720, a game presentation is determined by processor 204. In various embodiments, determining a game presentation includes selecting a record from Award table 610 that has an amount the same as the bingo game outcome amount. Then, the one or more presentation records that are linked to the selected record from Award table 610 are selected by processor 204. If there is more than one record from Presentation table 620, in certain embodiments, then one record is selected randomly. In other embodiments, other criteria may be used to select one record from Presentation table 620. For example, a random determination may be made to select one record from the multiple matching records. In other embodiments, a database may track selected presentation records and avoid selecting a presentation record that was recently selected, to avoid repeating a same presentation within a predetermined amount of time or gaming session.

After selecting a presentation record, one or more segments that are linked to the selected presentation record are determined from Segment table 630, at block 730 by processor 204. In certain embodiments, all the segments that are linked to the selected presentation record are determined. This may be done by selecting the first linked segment from Segment table 630 and then determining the next segment using the selected segment's next segment field, so on, until all segment records are retrieved. In certain embodiments, only the first record from the Segment table 630 is retrieved and after the outcome for the retrieved segment is displayed, the next segment is retrieved from Segment table 630. At block 740, RNG Seed stored in Segment table 630 is retrieved from the current segment by processor 204. At block 750, an outcome is determined using the retrieved RNG seed by processor 204. The outcome is determined by executing RNG 212 with the RNG seed as the seed parameter. RNG 212 generates random numbers that are used to generate a game outcome. The outcome consists of reel stop positions of each of the reels used in the reel-based game. In some embodiments, a single RNG seed may be used to generate random numbers that correspond to reel stops for each of the reels of the reel-based game. For example, in a five reel game, each reel may use an outcome from a RNG to determine its corresponding reel stop positions. A single RNG seed may be used to generate 5 random numbers from the RNG. RNG Count field in Segment table 630 may store the value 5, indicating to processor 204 that five random numbers are to be generated using the selected RNG Seed. Those 5 random numbers are then used to determine the reel stop positions of the five reels.

At block 760, the reels are displayed as spinning and stop at the reel stop positions from the outcome by processor 204. If there is another segment that is part of the selected presentation at 770, then the RNG seed for the next segment is determined at 740, an outcome is generated at 750 and the outcome is displayed at 760. This process continues until there are no more segments in the selected presentation.

As will be apparent to those skilled in the art, using a single RNG seed to generate one or more random number outcomes is more efficient that storing each outcome or reel stop position for each reel. By storing one RNG Seed that can generate multiple outcomes instead of storing the multiple outcomes, the amount of space needed is reduced and the database size is reduced as well. Querying a smaller database is also quicker than querying a larger database and results in faster generation of outcomes.

In certain embodiments, a game presentation may correspond to a trigger of a bonus game, such as a free spin game. In some situations, this occurs when the bingo game award amount corresponds to an amount that cannot be displayed using the outcome of a base game of the reel-based game. In certain other situations, to keep player engaged, even smaller bingo game award amounts that can normally be displayed using the outcome of the base game of the reel-based game, may correspond to the display of a bonus game. For example, a bingo game award amount of 500 credits may be displayed using a 5 of a kind outcome of a major symbol in reel-based game. However, it may also be displayed as an outcome that triggers a play of 5 free spins, with award amounts of 25, 0, 175, 0, and 300, corresponding to each of the 5 free spins. In this example, Award table 610 may store a record with AwardID of 10 and an amount of 500. In Presentation table 620, there may be at least 2 records with AwardID of 10. The first record may point to a segment in Segment table 630 with an RNG Seed that when used by RNG 212 generates the game outcome showing the 5 of a kind outcome. As discussed above, the RNG Seed in this case may be used to generate 5 random numbers, one for each of the reels. Another record may point to a first segment in Segment table 630 with an RNG Seed that when used by RNG 212 generates the game outcome showing a trigger of a free spin game. The first segment then points to a second segment which corresponds to a first spin of the free spin game, and the second segment points to a third segment which corresponds to a second spin of the free spin game, and so on. Additionally, the entire sequence of the base game triggering the free spin game and the spin of each free spin game may be stored as a single RNG Seed. That single RNG Seed can be used to generate 30 random numbers, 5 that are used to determine reel stop positions for 5 reels for the base game outcome, and 5 for each of the 5 free spins.

In various embodiments, RNG seeds are determined by simulating play of the reel-based game with randomly generated RNG seeds. These randomly generated RNG seeds are then used to generate random numbers that determine reel stop positions. The outcome of the reel-based game is determined from the reel stop position and the RNG seed along with the outcome is stored in the database. In this manner, a large number of RNG seeds and their corresponding outcomes may be determined and stored in the database. This database may be similar to the database depicted in FIG. 6, which is then used during gameplay to generate outcomes from a bingo based outcome.

Figure 8:
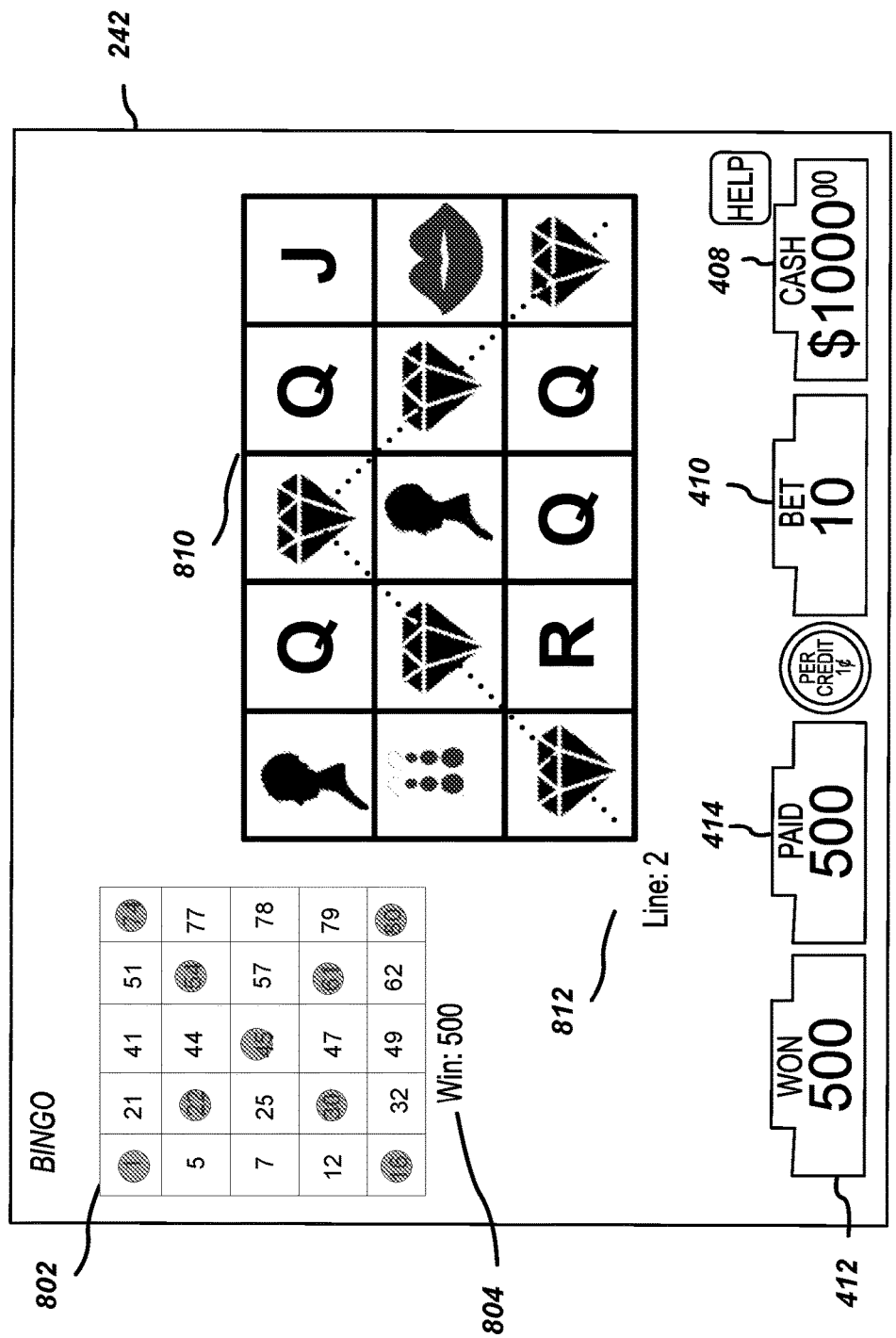
FIG. 8 depicts a Class II bingo game showing an example of a bingo game outcome award that is displayed as a reel type game.

FIG. 8 depicts a Class II bingo game showing an example of a bingo game outcome award of 500 credits that is displayed as a reel type game. As seen in FIG. 8, bingo game outcome 802 corresponds to a pattern that pays 500 credits according to a bingo game paytable (not shown in the example of FIG. 8). Bingo game outcome award 804 shows the value of 500 credits. After bingo game outcome award 804 is determined, a process, such as process 700, may be executed by EGM 200 to determine the outcome of the reel-based game. In this example, process 700 may determine to show a 5 of a kind win that corresponds to a 500 credit payout. The outcome of the reel-based game is shown as an array of symbol positions 810 which depicts 5 reels, with each reel containing 3 symbol display positions. Array of symbol positions 810 shows a number of symbols that are part of the outcome. Each of the 5 reels is stopped at a corresponding reel stop position. Each reel stop position indicates that a particular location on the reel may be displayed at one of the three display positions in array 810 for that reel. In the example of FIG. 8, the outcome of the reel type game is shown as a win of 500 credits because of a 5 of a kind of the diamond symbol on payline 2 (812).

Figure 9:
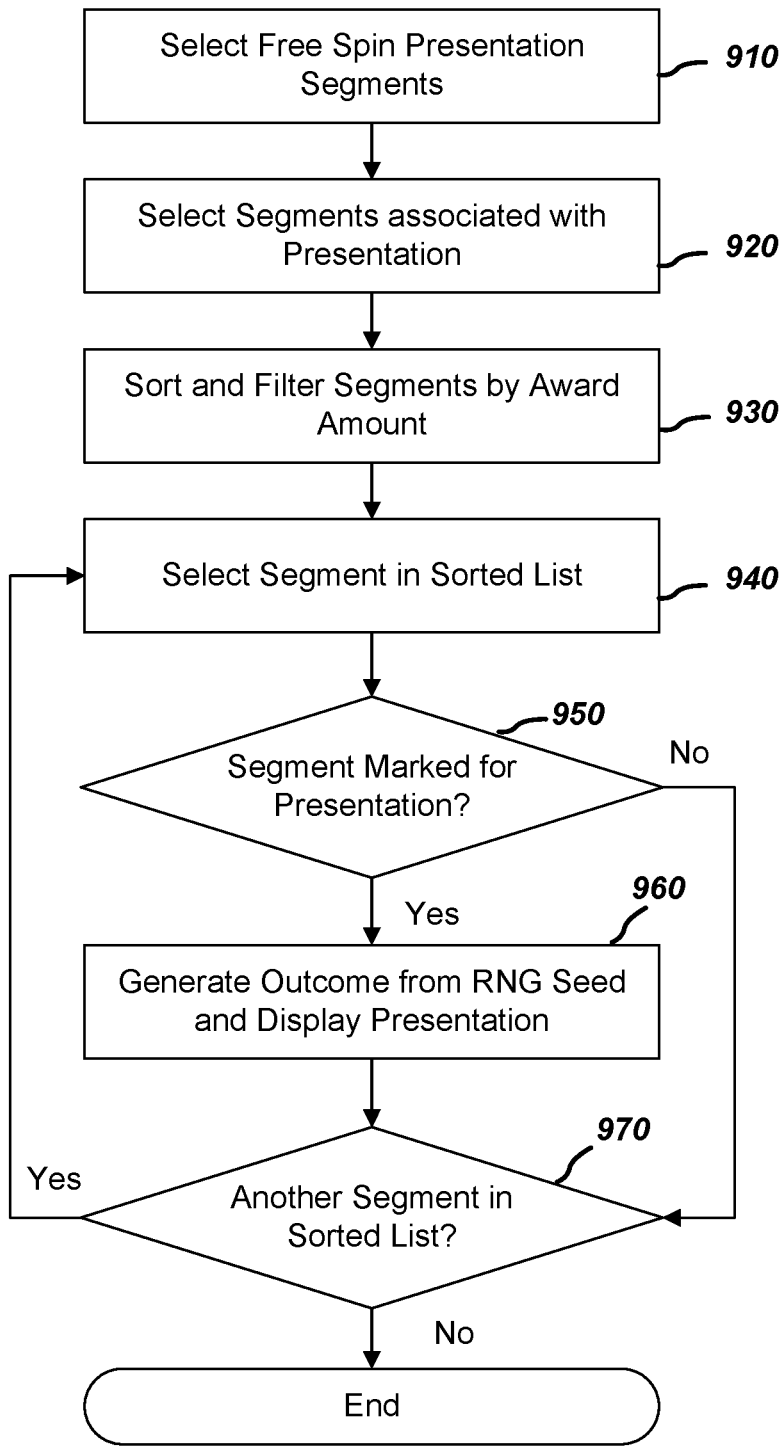
FIG. 9 depicts a flowchart for the operation of various embodiments in accordance with the present disclosure of a process to sort and filter the outcomes of each of the free spin games.

In various embodiments, when the selected presentation includes a number of free spin games, an additional process may be used to sort and filter the outcomes of each of the free spin games. Using the previously described example, where an outcome of 500 credits may be presented as a free spin game with award amounts of 25, 0, 175, 0, and 300 corresponding to each of the 5 free spins. FIG. 9 depicts a flowchart for the operation of various embodiments in accordance with the present disclosure of a process 900 to sort and filter the outcomes of each of the free spin games. All segments that are linked to the selected free spin presentation may be selected by game controller 202 and stored in memory 208, at 910. In various embodiments, processor 204 may select the first segment linked to the selected presentation from Presentation table 620. Next, processor 204 may iteratively select segments from Segment table 630 starting from the first segment and selecting a next segment using NextSegment field in Segment table 630, at 920. Once all segments linked to a free spin presentation are selected and read into memory, processor 204 sorts and filters the segments by award amount, at 930. In various embodiments, an award amount is stored in Segment table 630 for each segment. This may also be read into memory by processor 204 at 920. Segments may be sorted in any order, ascending or descending. Further, those segments that correspond to an award amount of 0 (or any other predetermined value or criteria, e.g., less than 25 credits) may be marked not for presentation. In one example, process 900 may be used to generate a sorted list of segments arranged in ascending order of award amount where any segments that have a 0 award amount are marked not for presentation. This sorted and filtered list may be generated by processor 204. At 940, the first segment in this list is selected. Processor 204 determines whether the selected segment is marked for presentation at 950. In case the segment is not marked for presentation, control may move to 970 where processor 204 may determine there is another segment in the sorted list. If, at 950, processor 204 determines that the segment is marked for presentation, a game outcome may be generated by game controller 202 using the RNG Seed associated with the segment, at 960. The generated game outcome may then be displayed by processor 204. Processor 204 may then determine whether another segment exists in the sorted list at 970. If that is the case, control moves to 940 where the next segment is selected. Otherwise, process 900 may end. By filtering certain results prior to generating the reel stops, processor 204 may be able to improve efficiency by reducing the processing time needed to determine the outcomes for those results. This increases the overall efficiency in determining and presenting results.

As described above, the bingo game outcome award of 500 credits may also be represented by another presentation that corresponds to play of 5 free spins. As will be apparent to those skilled in the art, the present disclosure is not limited to just those outcomes and presentations, but these outcomes and presentations serve as examples illustrating how the present disclosure can be used to map the outcome of a bingo game outcome to the outcome of a different game, such as a slot based game. Further, the present disclosure may be used to map the outcome of a different type of game, such as a centrally determined game using lottery outcomes to a slot game. In that case, instead of determining the award amount from a bingo outcome, such as a ball call and bingo card, the central determination server may provide either an award amount that corresponding to a virtual lottery ticket, or may provide a virtual lottery ticket that is then processed by processor 204 to determine an award amount. In some embodiments, a virtual lottery ticket may provide an indication of a record in Award table 610, a record in Presentation table 620, or a record in Segment table 630 corresponding to an award amount of the virtual lottery ticket.

In certain embodiments, a segment may be used with a number of different presentations. For example, a three of a kind symbol win may be a more common presentation and may be occur more frequently than other types of symbol combinations. This three of kind win may also occur in certain free spin games. The RNG seed for the three of a kind presentation, stored in Segment table 630, may be linked to a base game presentation and also be a part of a free spin game presentation, thereby further reducing the size of the database shown in FIG. 6.

Further, there may be certain free spin bonus games that do not provide any award for any of the free spin games. By storing the award amount with the segment, processor 204 may be able to parse all the segments of the free spin game prior to displaying the outcomes, determine that none of the segments have an award amount, and skip the display of the free spin bonus game entirely. This reduces the time a player must sit through the play of free spin games that have no payout. Having to watch the display of a free spin game with no payout usually results in a bad player experience, since there is usually some anticipation of a big award. By skipping it, this anticipation and the subsequent negative experience is avoided. Further, not having to generate 5 outcomes with 0 awards saves processing cycles.

In certain embodiments, the database as shown in FIG. 6 may be generated by one or more tools. These database generation tools may be programmed to skip or eliminate certain non-winning outcomes from the database. For example, the tool may be programmed to skip or eliminate certain free spin outcomes that do not have a corresponding win. In this manner, only the winning spins of a free spin game may be stored in the database. This improves database efficiency, reduces the amount of data being stored in the database and greatly improves retrieval times from the database due to its reduced size. Further, the tool may be programmed to arrange the RNG seeds in a certain order. For example, spins of a free spin game and their corresponding RNG seeds may be arranged in the database such that they are stored sequentially, from smallest to largest.

Although the flowchart of FIGS. 5, 7, and 9 show a specific order of execution, it is understood that the order of execution may differ from that which is depicted. For example, the order of execution of two or more blocks may be scrambled relative to the order shown. Also, two or more blocks shown in succession in FIG. 5, 7, or 9 may be executed concurrently or with partial concurrence. Further, in some embodiments, one or more of the blocks shown in FIG. 5, 7, or 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:
   at least one memory with instructions stored thereon; and
   at least one processor in communication with the at least one memory, wherein the instructions, when executed by the at least one processor, cause the at least one processor to:
   determine an outcome amount for an electronic game;
   select an award profile associated with the outcome amount and stored in the at least one memory;
   select a presentation record associated with the award profile and stored in the at least one memory;
   determine a plurality of segments based on the presentation record, wherein a first segment of the plurality of segments is linked to a second segment of the plurality of segments, and wherein each of the plurality of segments is associated with a random number generator (RNG) seed value;
   cause display of a first electronic game outcome associated with the RNG seed value associated with the first segment; and
   based at least in part upon the first segment being linked to the second segment and after the first electronic game outcome is displayed, cause display of a second electronic game outcome associated with the RNG seed value associated with the second segment.

2. The electronic gaming device of claim 1, wherein the instructions further cause the at least one processor to determine the first segment of the plurality of segments based at least in part upon the presentation record being linked to the first segment.

3. The electronic gaming device of claim 1, wherein the second segment is linked to a third segment of the plurality of segments, and wherein the instructions further cause the at least one processor to, based at least in part upon the second segment being linked to the third segment and after the second electronic game outcome is displayed, cause display of a third electronic game outcome associated with the RNG seed value associated with the third segment.

4. The electronic gaming device of claim 1, wherein the instructions further cause the at least one processor to determine the first electronic game outcome based on an RNG output from an RNG in response to the RNG seed value associated with the first segment being inputted to the RNG.

5. The electronic gaming device of claim 1, wherein the instructions further cause the at least one processor to determine the second electronic game outcome based on an RNG output from an RNG in response to the RNG seed value associated with the second segment being inputted to the RNG.

6. The electronic gaming device of claim 1, wherein the instructions further cause the at least one processor to determine the outcome amount based at least in part upon a message received from a server, wherein the message is associated with the outcome amount.

7. The electronic gaming device of claim 1, wherein the outcome amount is based at least in part upon a bingo card and a ball call.

8. The electronic gaming device of claim 1, wherein at least one of the first electronic game outcome or the second electronic game outcome is displayed as a reel-based game outcome.

9. At least one non-transitory computer-readable storage medium with instructions stored thereon that, in response to execution by at least one processor, cause the at least one processor to:
   determine an outcome amount for an electronic game;
   select an award profile associated with the outcome amount;
   select a presentation record associated with the award profile;
   determine a plurality of segments based on the presentation record, wherein a first segment of the plurality of segments is linked to a second segment of the plurality of segments, and wherein each of the plurality of segments is associated with a random number generator (RNG) seed value;
   cause display of a first electronic game outcome associated with the RNG seed value associated with the first segment; and
   based at least in part upon the first segment being linked to the second segment and after the first electronic game outcome is displayed, cause display of a second electronic game outcome associated with the RNG seed value associated with the second segment.

10. The at least one non-transitory computer-readable storage medium of claim 9, wherein the instructions further cause the at least one processor to determine the first segment of the plurality of segments based at least in part upon the presentation record being linked to the first segment.

11. The at least one non-transitory computer-readable storage medium of claim 9, wherein the second segment is linked to a third segment of the plurality of segments, and wherein the instructions further cause the at least one processor to, based at least in part upon the second segment being linked to the third segment and after the second electronic game outcome is displayed, cause display of a third electronic game outcome associated with the RNG seed value associated with the third segment.

12. The at least one non-transitory computer-readable storage medium of claim 9, wherein the instructions further cause the at least one processor to determine the first electronic game outcome based on an RNG output from an RNG in response to the RNG seed value associated with the first segment being inputted to the RNG.

13. The at least one non-transitory computer-readable storage medium of claim 9, wherein the instructions further cause the at least one processor to determine the second electronic game outcome based on an RNG output from an RNG in response to the RNG seed value associated with the second segment being inputted to the RNG.

14. The at least one non-transitory computer-readable storage medium of claim 9, wherein the instructions further cause the at least one processor to at least one of cause display of the first electronic game outcome or cause display of the second electronic game outcome by transmitting at least one message to an electronic gaming device where the electronic game is displayed.

15. The at least one non-transitory computer-readable storage medium of claim 9, wherein the outcome amount is based at least in part upon a bingo card and a ball call.

16. The at least one non-transitory computer-readable storage medium of claim 9, wherein at least one of the first electronic game outcome or the second electronic game outcome is displayed as a reel-based game outcome.

17. A method of electronic gaming implemented by at least one processor in communication with at least one memory, the method comprising:
   determining an outcome amount for an electronic game;
   selecting an award profile associated with the outcome amount and stored in the at least one memory;
   selecting a presentation record associated with the award profile and stored in the at least one memory;
   determining a plurality of segments based on the presentation record, wherein a first segment of the plurality of segments is linked to a second segment of the plurality of segments, and wherein each of the plurality of segments is associated with a random number generator (RNG) seed value;
   causing display of a first electronic game outcome associated with the RNG seed value associated with the first segment; and
   based at least in part upon the first segment being linked to the second segment and after the first electronic game outcome is displayed, causing display of a second electronic game outcome associated with the RNG seed value associated with the second segment.

18. The method of claim 17, wherein the first segment of the plurality of segments is determined based at least in part upon the presentation record being linked to the first segment.

19. The method of claim 17, wherein the outcome amount is determined based at least in part upon a message received from a server, and wherein the message is associated with the outcome amount.

20. The method of claim 17, wherein at least one of causing display of the first electronic game outcome or causing display of the second electronic game outcome is performed by transmitting at least one message to an electronic gaming device where the electronic game is displayed.

* * * * *